(12) United States Patent
Stauffer

(10) Patent No.: US 11,590,553 B2
(45) Date of Patent: Feb. 28, 2023

(54) CENTERING DEVICE

(71) Applicant: Guedel Group AG, Langenthal (CH)

(72) Inventor: Adrian Stauffer, Langenthal (CH)

(73) Assignee: GÜDEL AG, Langenthal (CH)

( * ) Notice: Subject to any disclaimer, the term of this patent is extended or adjusted under 35 U.S.C. 154(b) by 734 days.

(21) Appl. No.: 16/488,859

(22) PCT Filed: Mar. 16, 2017

(86) PCT No.: PCT/EP2017/056272
§ 371 (c)(1),
(2) Date: Aug. 26, 2019

(87) PCT Pub. No.: WO2018/166604
PCT Pub. Date: Sep. 20, 2018

(65) Prior Publication Data
US 2019/0388954 A1   Dec. 26, 2019

(51) Int. Cl.
*B21D 43/00* (2006.01)
*B21D 43/05* (2006.01)
(Continued)

(52) U.S. Cl.
CPC ............ *B21D 43/003* (2013.01); *B21D 43/05* (2013.01); *B21D 43/18* (2013.01); *B25J 9/0084* (2013.01); *B25J 9/0093* (2013.01); *B25J 15/0061* (2013.01); *B65G 47/244* (2013.01); *B65G 47/91* (2013.01)

(58) Field of Classification Search
CPC .... B25J 9/0084; B25J 9/0093; B25J 15/0061; B65G 47/244; B65G 47/91
See application file for complete search history.

(56) References Cited

U.S. PATENT DOCUMENTS 3,680,677 A * 8/1972 Branch ................ B65G 17/323
198/689.1
4,747,477 A * 5/1988 Benz ...................... B65G 47/54
198/367
(Continued)

FOREIGN PATENT DOCUMENTS

CN    101068634 A    11/2007
CN    101497400 A    8/2009
(Continued)

OTHER PUBLICATIONS

Chinese Office Action and Search Report dated Apr. 23, 2020, for Chinese Application No. 201780088477.1.
(Continued)

*Primary Examiner* — Lynn E Schwenning
(74) *Attorney, Agent, or Firm* — Birch, Stewart, Kolasch & Birch, LLP

(57) ABSTRACT

A centering device (1) for centering flat workpieces (700-706) comprises a centering station (100) having at least a first and a second gripping device (300, 301) for gripping the workpiece (700-706), and conveying means for conveying workpieces (700-706) in a conveying direction to the centering station (100). The first and the second gripping device (300, 301) can each be moved horizontally by a first and a second guiding device (200, 201), respectively, and the first and the second gripping device (300, 301) can rotate freely about an axis.

21 Claims, 5 Drawing Sheets

(51) Int. Cl.
*B21D 43/18* (2006.01)
*B25J 9/00* (2006.01)
*B25J 15/00* (2006.01)
*B65G 47/244* (2006.01)
*B65G 47/91* (2006.01)

(56) References Cited

U.S. PATENT DOCUMENTS

| | | | |
|---|---|---|---|
| 5,458,226 A | 10/1995 | Nakao et al. | |
| 9,573,787 B2* | 2/2017 | Sperl | B65H 31/3045 |
| 2003/0118436 A1* | 6/2003 | Kameda | B65G 61/00 |
| | | | 414/799 |
| 2008/0181757 A1* | 7/2008 | Wheeler | B25J 19/0004 |
| | | | 414/815 |
| 2008/0265498 A1 | 10/2008 | Katsuyama | |
| 2010/0225035 A1 | 9/2010 | Gerber et al. | |
| 2012/0207574 A1* | 8/2012 | La Rovere | B25J 15/0616 |
| | | | 414/751.1 |
| 2015/0217359 A1* | 8/2015 | Segura Golorons | B21D 43/22 |
| | | | 414/790.9 |
| 2016/0159581 A1* | 6/2016 | Fourney | B65G 15/105 |
| | | | 198/370.09 |

FOREIGN PATENT DOCUMENTS

| | | | | |
|---|---|---|---|---|
| CN | 101909778 A | | 12/2010 | |
| CN | 201783504 U | | 4/2011 | |
| CN | 202935925 U | | 5/2013 | |
| DE | 101 55 596 A1 | | 7/2003 | |
| DE | 10 2008 019 110 A1 | | 10/2008 | |
| EP | 1 990 110 A1 | | 11/2008 | |
| GB | 2207413 | * | 2/1989 | ............. B25J 15/06 |
| JP | 61-46028 A | | 3/1986 | |
| JP | 5-44336 U | | 6/1993 | |
| JP | 7-39959 A | | 2/1995 | |
| JP | 2003-326327 A | | 11/2003 | |
| JP | 2003326327 | * | 11/2003 | ............. B21D 43/00 |
| JP | 2008-94547 A | | 4/2008 | |
| KR | 10-1341901 B1 | | 12/2013 | |
| KR | 10-2015-0023458 A | | 3/2015 | |
| KR | 10-1782537 B1 | | 9/2017 | |
| WO | WO 2013/185834 A1 | | 12/2013 | |

OTHER PUBLICATIONS

Office Action issued in Korean Patent Application No. 10-2019-7024577 dated Sep. 17, 2020 (translation only).

* cited by examiner

CENTERING DEVICE

TECHNICAL FIELD

The invention relates to a centering device for centering flat workpieces, in particular for sheet metal blanks to be processed in a press, comprising a centering station having at least a first and a second gripping device for gripping the workpiece, and conveying means for conveying workpieces in a conveying direction to the centering station.

PRIOR ART

Pre-punched sheet metal parts or "blanks" are often further processed in a press (for example a multi-station press or press line). Before the actual processing takes place in the press, the blanks supplied must generally be unstacked or separated, washed and, if required, oiled. To allow the blanks to be processed further in a precise manner in the press, they must be precisely positioned and oriented with a predetermined orientation after the operations mentioned and before being introduced into the press.

The workpieces to be centered are typically present as sheet metal blanks. Said blanks can lose a predefined position during transport or during a cleaning operation, in particular with improper transport. To minimize this risk, it is previously known for the workpieces to be gripped via robot arms and grippers at a plurality of locations simultaneously, to be raised and to be centered. However, such devices are expensive to acquire and the corresponding methods are very complicated and expensive to convert to new workpieces.

Also known are methods for positioning and orientation in which centering is carried out with mechanical slides and stops. However, they have the disadvantage that they must be converted in a complicated manner upon a change of the blank type by repositioning and reorienting the slides and stops. In addition, when processing irregularly shaped metal sheets or a plurality of small metal sheets, a large number of slides and stops is necessary to ensure the correct positioning. Mechanical slides also have the disadvantage that the blank can be damaged thereby during centering.

The known solutions have either a complex design or are complicated to convert to a new workpiece type, that is to say they are not readily usable for any desired workpieces.

SUMMARY OF THE INVENTION

It is an object of the invention to provide a centering device which belongs to the technical field stated at the outset and which can be universally used while having a compact and simple design.

The achievement of the object is defined by the features of claim 1. According to the invention, the first and the second gripping device can each be moved horizontally by a first and a second guiding device, respectively, and the first and the second gripping device can rotate freely about an axis.

Consequently, a particularly simple centering device is provided by a solution to be implemented in a technically simple manner. Gripping devices for gripping workpieces and also guiding devices for moving the gripping devices are known to a person skilled in the art and can moreover be realized in a technically particularly simple manner. Furthermore, guiding devices, in particular by contrast with driven balls of a ball table or of a ball plate, can be controlled in a particularly simple and precise manner.

By virtue of the fact that, for centering, the workpiece is gripped by preferably two freely rotatable gripping devices, particularly simple centering is made possible; particularly with the use of precisely two gripping devices which are freely rotatable about an axis, centering can be achieved via a particularly simple control. For the centering of a workpiece, the latter is gripped by preferably at least two gripping devices. After the workpiece has been gripped by the gripping device, the guiding devices are actuated in order to center the workpiece. Since the gripping device is now mounted in a rotatable manner, rotations of the workpiece which are generated by the two guiding devices can be taken up in a simple manner. By virtue of the free rotatability of the gripping devices, it thus only has to be ensured during centering that the distances of the gripping devices from one another remain constant, while the rotations arising during centering can be taken out by the freely rotatable gripping devices.

The gripping device is preferably mounted on the first guiding device so as to be freely rotatable, preferably exclusively freely rotatable, about a vertical axis. However, in principle, it is also conceivable that the gripping device can be additionally actively rotated and thus can actively support the centering, that is to say that the gripping device can be designed in such a way that both an active rotation and the free rotatability can be achieved. If the gripping devices are pivotable, the axis of rotation can also be oriented nonvertically.

The centering device allows workpieces to be rotated by an angle of more than 90° such that it can be used in a particularly broad field. It is additionally conceivable to guide the gripping devices in such a way that they can engage over one another for example in the conveying direction, whereby rotations about an angle of more than 180° would also be possible.

The term "centering" is to be understood below as meaning a change in the position and/or the orientation of the workpiece in the plane. The centering typically occurs via a translation, a rotation or both. Within the context of centering, the workpiece is preferably transferred by a superimposed translation/rotation from an actual position into a desired position. The actual position is typically that orientation of the workpiece in which the workpiece is conveyed to the centering station, and the desired position is that orientation of the workpiece in which the workpiece is intended to leave the centering station.

In a method for centering a flat workpiece, in particular a sheet metal blank to be processed in a press, the following steps are carried out:
a) determining a current position and an orientation of the workpiece conveyed on the conveying means by means of a detection device;
b) conveying the workpiece to a centering station;
c) gripping the workpiece with a first and a second gripping device which can rotate freely about an axis;
d) orienting the workpiece on the basis of the current position and of a desired position by the guiding devices.

These method steps provide a method for centering a workpiece that can be implemented in a particularly simple manner. Determining the position of the workpiece prior to reaching the centering station allows the latter to be designed in a particularly compact and simple manner. In particular, the centering station and the detection device can thus be formed, and for example maintained, upgraded or repaired, independently of one another, whereby the operation and maintenance of the centering device can be simplified.

The conveying means preferably comprise at least one conveyor belt. The workpieces can hence be transported quickly and precisely. A conveyor belt can, for example, take the form of a magnetic belt, whereby a workpiece can be fixed during transport. Instead of magnetic belts, there can also be provided other conveyor belts known to a person skilled in the art, such as vacuum belts, for example. The fixing of the workpiece on the conveyor belt can also be achieved, given a suitable choice of the conveyor belt surface, via the friction between the workpiece and the conveyor belt.

In variants, other conveying means can also be provided, for example conveyor plates, supporting rollers, ball plate, etc.

In a particularly preferred embodiment, the centering device is formed in such a way that, by virtue of the gripping devices and the guiding devices, the workpiece lies on a support surface during the centering operation. It is thus possible for particularly large or deformable workpieces, for example large metal sheets, to be oriented in a gentle manner. For this purpose, the workpiece does not necessarily have to lie on the conveyor belt. In a preferred embodiment, the workpiece lies, during centering, on a support surface which is different from the support surface of the conveyor belt (see below). Alternatively, for centering, the workpiece can also be completely or partially lifted off the conveyor belt or raised.

The conveyor belt preferably comprises a plurality of parallel conveyor belt strips which are spaced apart from one another, wherein a lifting unit having a workpiece support surface is arranged in an interspace between two conveyor belt strips, wherein, with the workpiece support surface raised, a workpiece lies exclusively on the workpiece support surface. Consequently, a workpiece conveyed on the conveyor belt can be raised in a simple manner. Raising the workpiece is advantageous particularly for centering the workpiece if centering on the conveyor belt itself is not suitable. This is typically the case when the conveyor belt is formed in such a way that an orientation of the workpiece during transport does not change. It is typically sought for the orientation of the workpiece during transport not to change; in particular, the orientation of the workpiece is intended, after centering, not to change for example during further transport. The lifting unit is preferably pneumatically operated, that is to say it comprises pneumatic cylinders by means of which the workpiece support surface can be raised and lowered directly or indirectly. Instead of the pneumatic cylinders, the lifting unit can also comprise other drives, for example there can be provided a spindle drive, hydraulic cylinders or the like.

In variants, it is also possible to dispense with the lifting unit between the conveyor belt strips. In this case, for centering, the workpiece can lie on the conveying means or be gripped from above, raised and centered by a gripping device.

During operation, for gripping a workpiece, the gripping device is preferably simultaneously lowered (see below) and the workpiece lifted off the conveyor belt by means of the lifting unit.

In variants, it is also possible first of all for the gripping device to be moved downward in order to fix the workpiece, whereupon the lifting unit together with the workpiece and the gripping device moves upward. In this case, the gripping device can be moved actively or passively upward together with the lifting unit.

The workpiece support surface preferably has a coefficient of friction which is less than a coefficient of friction of a workpiece support surface of the conveyor belt strips. This ensures that, with the workpiece support surface raised, the workpiece then lying on the workpiece support surface can be moved, in particular centered, counter to a lower frictional resistance. The workpiece can thus be precisely and efficiently centered efficiently, with greater accelerations and less risk of damage.

In variants, it is also possible to dispense with the different coefficients of friction.

The surface of the lifting unit preferably comprises a ball plate which is arranged in such a way that, with the lifting unit raised, a workpiece lies on balls of the ball plate. For this purpose, the balls of the ball plate are mounted in a freely rotatable manner, with the result that the workpiece can be moved, in particular centered, by the gripping device counter to as low a resistance as possible.

In variants, it is also possible to provide other means which can reduce a resistance during centering between support surface and workpiece. Instead of a ball plate, an air cushion or the like can also be provided, for example.

The centering station preferably further comprises a third and a fourth gripping device, wherein the third and the fourth gripping device can each be moved horizontally by means of a third and fourth guiding device, respectively. Particularly in the case of large-area workpieces, it is particularly advantageous if more than two gripping devices are available. The loading of individual gripping devices can thus be reduced, whereby an efficient method for centering larger workpieces can be achieved. However, depending on the arrangement of the gripping devices, it is thus also possible for a plurality of individual workpieces lying next to one another or behind one another to be centered simultaneously, whereby once again the efficiency in the method for centering the workpieces can be increased.

In variants, it is also possible to dispense with the third and the fourth gripping device. However, it is also conceivable to provide three or more than four gripping devices, in particular, for example, five, six, seven, eight or more guiding devices. The preferred number of guiding devices ultimately depends on the type of use, in particular on the size, the stability, the weight, the maximum carrying force of the gripping device, the number of workpieces to be processed in parallel and further factors.

With particular preference, precisely two gripping devices for centering a workpiece are used in the method.

One of the guiding devices preferably comprises a first linear guide for moving the gripping device in the conveying direction and a second linear guide for moving the first linear guide at a right angle to the conveying direction. A particularly simply designed, and thus cost-effective, Cartesian guide is thus provided. Cartesian guiding devices have the advantage that they have a cost-effective design, are simple to control and are additionally low-maintenance. Here, the orientation of the first linear guide at a right angle to the conveying direction has the advantage that the centering device as a whole can have a compact design. It is thus particularly possible in the centering station to dispense substantially with a large overhang of the centering station beyond the conveyor belt width. In particular, the second linear guide can be such that two or more second linear guides are guided on this first linear guide.

In variants, the guiding devices can comprise a first linear guide for moving the gripping device at a right angle to the conveying direction and a second linear guide for moving the first linear guide in the conveying direction. It is also conceivable that the first and the second linear guides do not extend parallel to one another. For example, the rails for the first linear guides of the first and of the second guiding devices can be at a right angle to one another. Finally, one or more of the guiding devices can also take the form of robots which can have in particular four, five, six or more axes.

The first linear guides of the first and of the second guide are preferably arranged parallel to one another, and the second linear guides of the first and the second guide are arranged in alignment with one another. With particular preference, the first linear guides of the first and of the second guide comprise a, preferably a single, rail guide transversely to the conveying direction on which the first linear guides are movable transversely to the conveying direction. The rail guides arranged in alignment or the common rail guide of the first linear guides of two guiding devices make it possible once again to achieve a compact or cost-effective design of the centering device. Here, the two first linear guides can be moved via dedicated drives, with the result that they can be controlled independently of one another. Here, however, it can be accepted that the two first linear guides are not able to cross one another.

In variants, the first linear guides can also be guided on separate rail guides and in particular be arranged offset in parallel to one another.

The first linear guide preferably comprises a belt drive for moving the gripping device and/or the second linear guide comprises a belt drive for moving the first linear guide. With particular preference, the first and the second linear guides each comprise a belt drive. The use of belt drives has the advantage that large accelerations and quick movements with great precision can be carried out. In addition, belt drives are cost-effective to acquire and to maintain. However, it is also conceivable that only the first or only the second linear guides comprise a belt drive, while the other linear guides comprise a further drive, for example a spindle drive, a pneumatic or hydraulic drive, rack drive, linear motor, etc.

In variants, other drives than a belt drive can also be provided for the first and the second linear guides. In this case, too, the drives do not have to be formed identically in the first and the second linear guides. Thus, a first linear guide could comprise a spindle, while the second linear guide is operated by a linear motor.

With preference, the gripping device can be lowered and raised, preferably can be pneumatically raised and/or lowered, in particular relative to the first linear guide. The gripping device can thus be guided to the workpiece in a simple manner such that the workpiece can be gripped. For this purpose, the gripping device comprises a lifting device, wherein a lifting direction is preferably oriented vertically, preferably at a right angle to a support surface of the conveyor belt. The lifting device can be formed in such a way that the workpiece can be held without force with respect to a lifting direction. In this case, for centering, the workpiece would be drawn over the support surface of the conveyor belt or of the ball plate. This embodiment is particularly advantageous in the case of large and/or bendable workpieces which can be deformed in particular under their own load, since it is possible thereby to avoid deformation of the workpiece and thus a distortion of the orientation after setting down. On the other hand, the lifting device can also be formed in such a way that the workpiece can be actively raised and lowered by means of the lifting device. It is thus possible in particular for smaller or dimensionally stable workpieces to be centered in a friction-free manner. The lifting device can also be formed in such a way that both a force-free holding in the vertical direction and an active raising of the workpieces is possible.

In variants, it is also possible to dispense with the lowerability and raisability of the gripping device relative to the first linear guide. Furthermore, instead of the gripping device being designed to be raisable and lowerable relative to the first linear guide, it is also possible for the first linear guide, together with the gripping device, to be designed to be raisable and lowerable relative to the second linear guide. Finally, the guide as a whole can also be designed to be raisable and lowerable.

The gripping device can preferably be raised pneumatically, in particular counter to a restoring force, preferably counter to a spring force. The gripping device is thus lowered in the no-energy state. This arrangement is advantageous since it is thereby possible for the gripping device to be moved downward with constant force, with relaxation of the spring. The force can be preset in a simple manner through the choice of the spring with desired spring constant. With particular preference, the gripping device is lowered exclusively via the spring force. Exertion of pressure on the workpiece can thus be controlled in a simple manner. The gripping device is preferably raised pneumatically. Particularly quick movements can thus be executed, that is to say that the gripping device can be quickly raised after centering. Shorter cycles are thus achieved during centering, whereby a particularly efficient method is created.

In variants, the gripping device can also be designed to be raisable and lowerable in some other way. Lowering can also occur by gravitational force. Furthermore, in principle, raising, instead of lowering, can also occur against a spring force. It is thus possible during operation of the guiding devices to avoid damage to the centering device in the case of malfunctions of the lifting device, for example in the case of a leak in the pneumatics. Furthermore, both raising and lowering can occur pneumatically with a so-called pneumatic spring. There can furthermore also be provided, instead of the pneumatics, rack drives, hydraulic drives, in particular with short strokes also magnetic drives, etc.

The gripping device preferably comprises a sucker for gripping the workpiece. It is possible particularly in the case of an already pneumatically actuated lifting device for the existing infrastructure to be better utilized. Thus, for example, the conveyor belt could also be designed as vacuum belts. Suckers additionally make it possible for workpieces to be gripped in a particularly gentle manner. Furthermore, the gripping of the workpieces with suckers proves to be particularly simple since substantially only an area of the workpiece needs to be present that corresponds to the sucker diameter.

In variants, the gripping device can also be designed in some other way. Thus, the gripping device can comprise an electromagnet, for example. Furthermore, the gripping device can also comprise actively actuatable clamps. There can also be provided hooks which can engage, for example, behind an edge region of the workpiece. A person skilled in the art is also familiar with further possible designs of a gripper.

The centering device preferably comprises a detection device for detecting a position and an orientation of a conveyed workpiece. The position and the orientation of the workpiece can then be corrected by the centering device on the basis of this detected information. The detection device is thus arranged upstream of the centering station such that the actual position can be determined before centering.

In variants, the detection device can also be encompassed by the centering station. In this case, the actual position can be recognized by means of the centering station itself, for example by the grippers gripping points which are predefined on the workpiece.

The detection device preferably comprises a line camera which is arranged upstream of the centering station with respect to a conveying direction. The line camera is thus arranged in the feed path of the workpieces and preferably extends in the transverse direction over a feed path for the workpieces. The position and orientation of the workpieces is thus detected by the line camera while they are being fed. The line camera can be designed in a simple manner, allows precise detection of position and orientation and, by contrast with other detection devices, such as cameras, for example, requires no elaborate image processing.

In variants, however, there can also be provided another detection device, for example a camera, a sensor grid or the like.

In a preferred embodiment, the line camera is arranged in the transition, in particular in a gap, between two conveyor belts and comprises a scanner, which is preferably situated vertically below the support surface of the workpieces, and a reflector which is situated vertically above the space through which the workpieces are conveyed. The workpiece is thus scanned from the lower side.

In variants, the workpiece can be scanned from above. For this purpose, the scanner would be situated vertically above a support surface of the workpieces. Furthermore, a photo can also be taken from above in order to detect the actual position of the workpiece. In principle, the device can also comprise a detection device downstream of the centering station in the conveying direction in order to compare the position of the workpiece after centering with the desired position. However, it is also possible to dispense with this detection device.

The centering device preferably comprises a control device which is designed in such a way that the centering station can be controlled on the basis of measurement data of the line camera in such a way that a desired orientation of the workpiece can be achieved. Here, a light-dark profile of the workpiece is preferably determined by the line camera. Data which can be processed in a simple manner are thus obtained which allow precise positioning and orientation of the workpiece.

The detected profile can be compared in particular with a desired profile which represents the position and orientation expected by the following processing station. Deviations between the light-dark profile and the desired profile are evaluated by the control in a manner known per se and converted into corrections to be performed, for example corrections in the angle of rotation, in the longitudinal direction and in the transverse direction. The corrections are then implemented by the guiding devices such that the ready-positioned and ready-oriented workpiece corresponds to the desired profile.

Further advantageous embodiments and combinations of features of the invention will emerge from the following detailed description and the whole of the patent claims.

BRIEF DESCRIPTION OF THE DRAWINGS

In the drawings used to explain the exemplary embodiment.

In principle, identical parts are provided with the same reference signs in the figures.

WAYS OF IMPLEMENTING THE INVENTION

Figure 1:
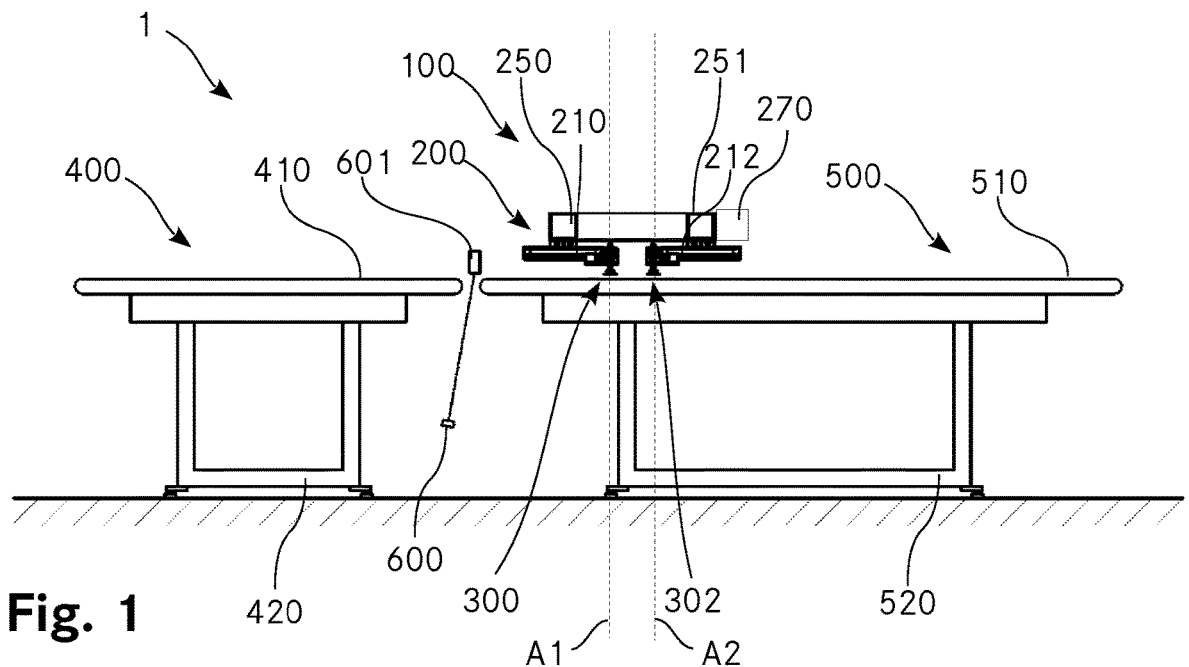
FIG. 1 shows a schematic illustration of a side view of a centering device transversely to the conveying direction.

FIG. 1 shows a schematic illustration of a side view of a centering device 1 transversely to the conveying direction.

In the present case, the centering device 1 comprises a conveyor belt 400 for conveying workpieces (not shown in FIG. 1). For this purpose, the conveyor belt 400 comprises a plurality of conveyor belt strips 410 which are oriented in parallel in the conveying direction. The conveyor belt 400 comprises a substructure 420 on which the conveyor belt strips 410 are mounted. The conveyor belt strips 410 are driven by a drive (not shown), in particular one or more electric motors. In operation, the individual conveyor belt strips 410 are driven with the same speed (meter per second), in particular in rectilinear portions.

The centering device 1 further comprises a second conveyor belt 500 as a constituent part of the centering station 100. The conveyor belt 500 likewise comprises a plurality of conveyor belt strips 510 which are oriented in parallel in the conveying direction and which are driven analogously to the conveyor belt 400. The support surfaces of the conveyor belts lie substantially in the same plane, with the result that a workpiece can be transferred from the conveyor belt 400 to the conveyor belt 500.

Between the conveyor belt 400 and the conveyor belt 500 there is provided a gap across which a workpiece can be conveyed belt 400 to the conveyor belt 500. The gap is thus present transversely to the conveying direction. Below a support surface of the conveyor belts in the region of the gap there is mounted a line camera 600 by means of which a workpiece guided over the gap can be detected and its orientation and position determined. A reflector 601 for reflecting the light emitted by the line camera 600 is positioned above the support surface of the conveyor belts. The positioning below the support surface of the conveyor belts 400, 500 allows a particularly compact design of the centering device 1. The centering device 1 is controlled by a control device 270 on the basis of the measurement data of the line camera 600.

The centering station 100 further has a Cartesian guiding device 200, which, in FIG. 1, comprises two second linear guides 250, 251 which extend at a right angle to the image plane and parallel. On each of the two second linear guides 250, 251 there are arranged a first linear guide 210 with a gripping device 300 and a first linear guide 212 with a gripping device 302, respectively, such that they can be moved transversely to the conveying direction and horizontally. The gripping devices 300, 302 are movable on the two first linear guides 210, 212 in the conveying direction and can be raised and lowered with respect to the second linear guides 210, 212 (see below, FIGS. 5-7). The gripping devices 300, 302 are freely rotatable each about a vertical axis A1, A2.

Figure 2:
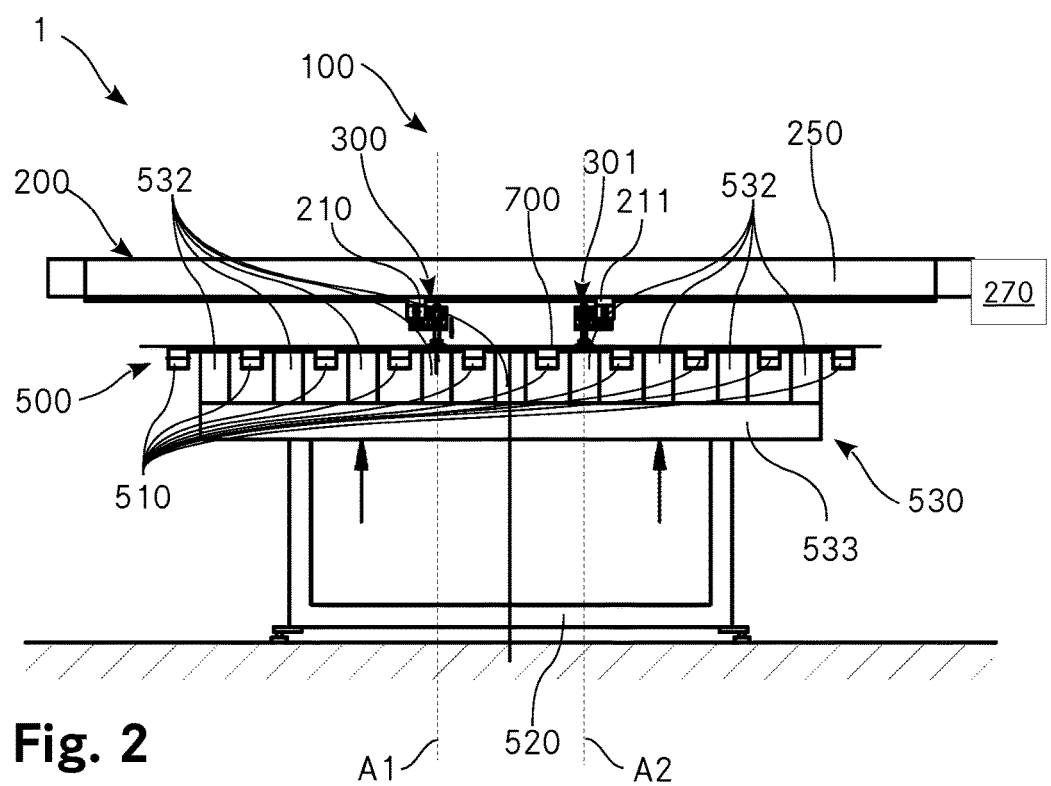
FIG. 2 shows a schematic illustration of a side view of a centering device in the conveying direction with the gripping devices lowered.

FIG. 2 shows a schematic illustration of a side view of a centering device 1 in the conveying direction with the gripping devices 300, 301 lowered. FIG. 2 now shows in particular the individual conveyor belt strips 510 which extend parallel in the conveying direction and, with regard to FIG. 2, orthogonally to the sheet plane. The individual conveyor belt strips 510 are therefore illustrated as substantially square.

FIG. 2 additionally shows a lifting unit 530 by means of which a conveyed workpiece 700 can be raised through interspaces between the conveyor belt strips 510. The lifting unit comprises a plurality of ball plates (see FIGS. 5-7) which are connected via a base plate 533 and which can be guided through the interspaces between the conveyor belt strips 510, with the result that a support surface for the workpiece 700 is created which is situated higher than the support surfaces of the conveyor belt strips. The ball plates 531 can be raised by means of one or more pneumatic cylinders (not shown).

In FIG. 2, the workpiece 700 is gripped by the gripping devices 300, 301, and the lifting unit 530 is in an upper position in which the workpiece 700 is not in contact with the conveyor belt strips 510. The details in this respect are described in more detail in FIGS. 5-7. In this configuration, the workpiece 700 can now be centered by means of the Cartesian guide 200. For this purpose, the individual linear guides 210, 211, 250 (the linear guide 251 is not visible and is situated behind the linear guide 250) are moved on the basis of the actual position determined by the line camera 600 and the known desired position in order to transfer the workpiece 700 into the desired position. By moving the gripping devices 300, 301 by means of the linear guides 210, 211, 250, 251 the workpiece 700 is rotated as the gripping devices 300, 301 are freely rotatable about the vertical axes A1, A2.

Figure 3:
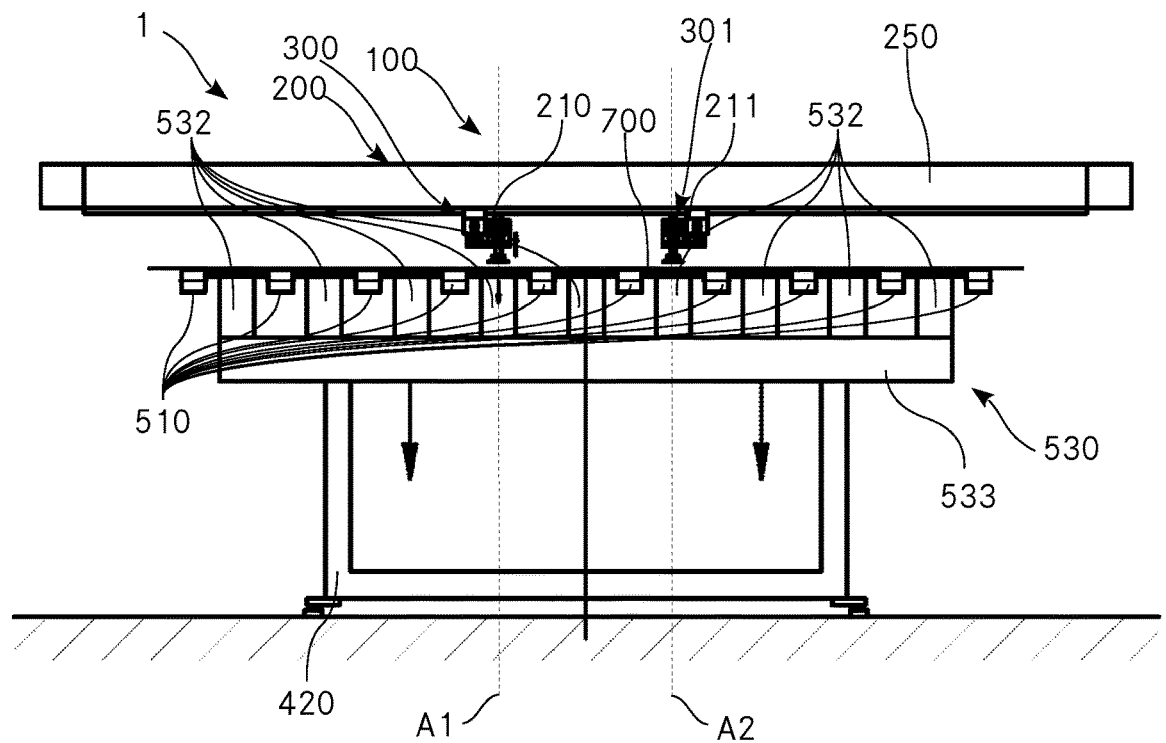
FIG. 3 shows a schematic illustration of a side view of a centering device in the conveying direction with the gripping devices raised.

FIG. 3 shows a schematic illustration of a side view of a centering device in the conveying direction with the gripping devices 300, 301 raised. After the workpiece 700 has been transferred into the desired position, the lifting unit 530 is moved downward on the one hand and the gripping devices 300, 301 are moved upward on the other hand, whereby the workpiece 700 lies again on the conveyor belt 500 and can be transported further by the latter, in particular for example to a press for further processing of the workpiece 700.

Figure 4:
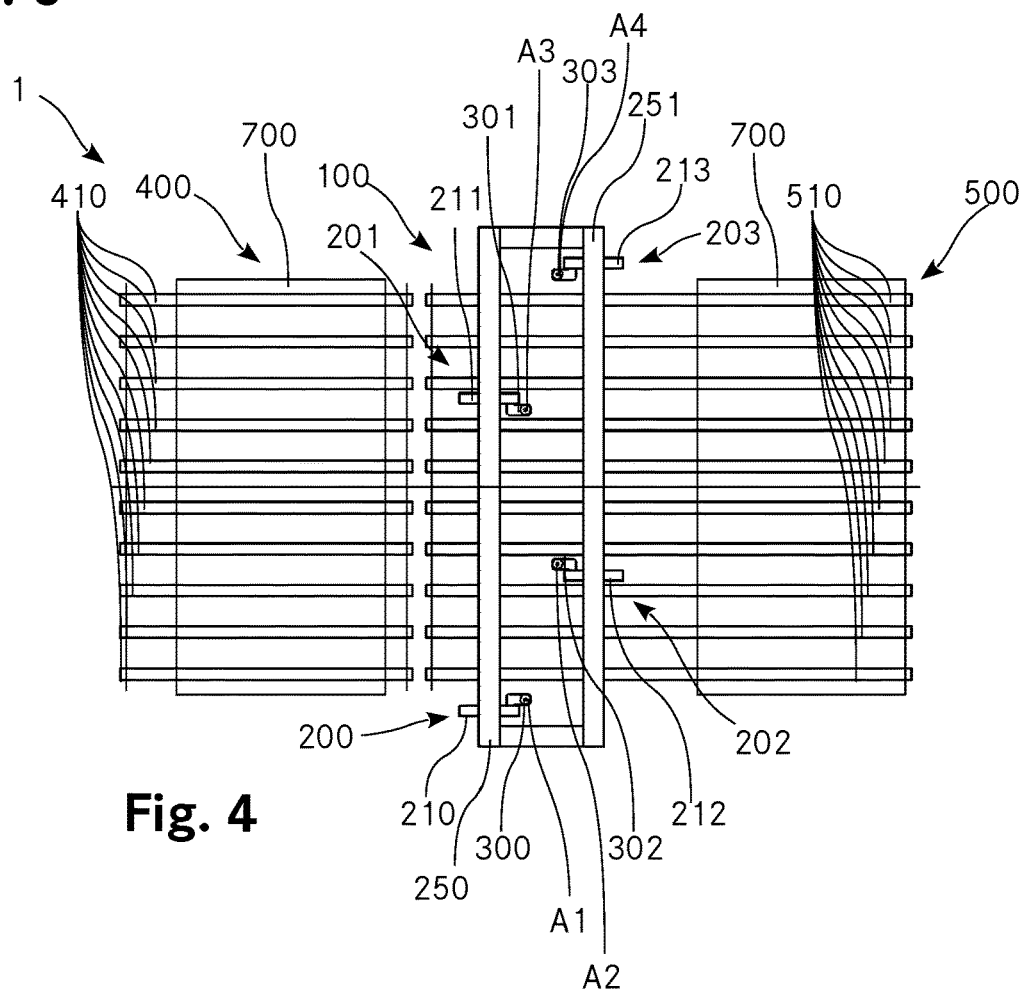
FIG. 4 shows a schematic illustration of a plan view of a centering device.

FIG. 4 shows a schematic illustration of a plan view of a centering device 100, wherein in each case a workpiece 700 is guided on the conveyor belt 400 and downstream of the Cartesian guiding devices 200-203 in the conveying direction. FIG. 4 thus shows a state in the transition period in which a workpiece 700 has just been oriented and a further workpiece 700 is situated before the entry into the centering station 100. In the present case, the centering station 100 has a Cartesian guiding device 200 with two second linear guides 250, 251 offset in parallel transversely to the conveying direction. The two second linear guides 250, 251 each comprise two first linear guides 210, 211 and 212, 213, respectively, on each of which a gripping device 300, 301 and 302, 303, respectively, is held. In the present case, the first linear guides 210, 211 and 212, 213, respectively, can be moved transversely to the conveying direction with the second linear guides 250, 251. The gripping devices 300, 301 and 302, 303, respectively, can be moved in the conveying direction with the first linear guides 210, 211 and 212, 213, respectively, and are each rotatable about a different vertical axis A1, A2, A3, A4.

Figure 5:
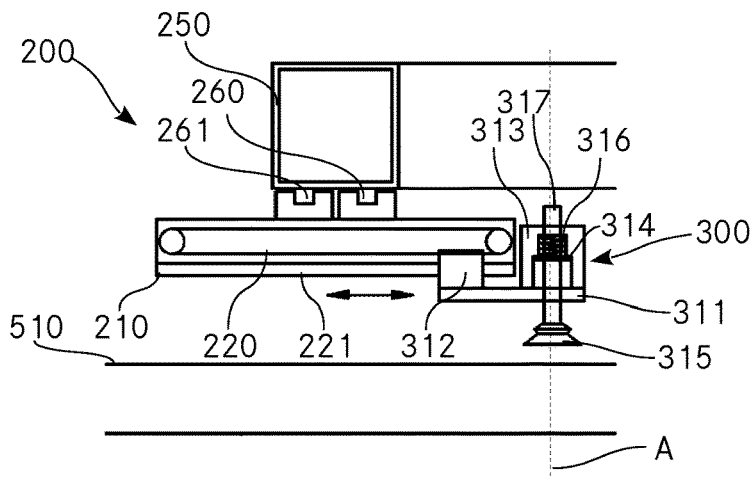
FIG. 5 shows a sectional illustration through a Cartesian guiding device in the conveying direction.
Figure 6:
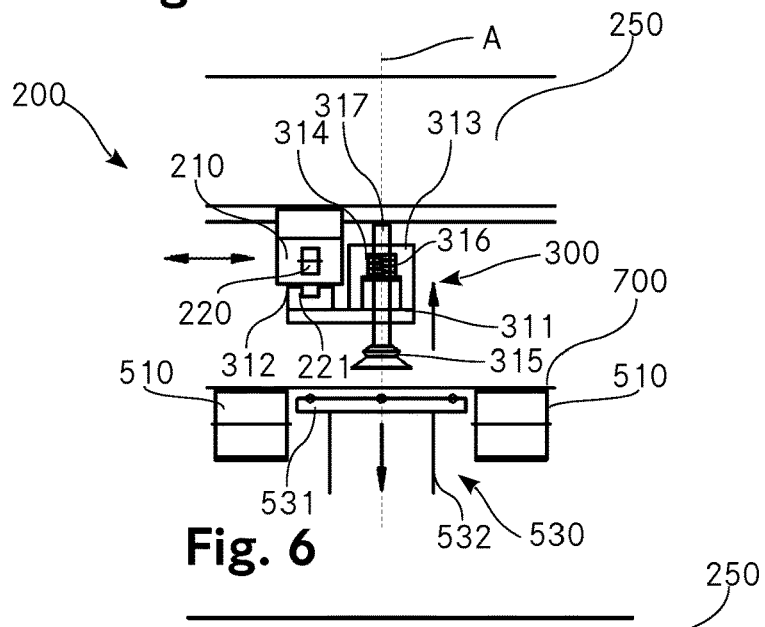
FIG. 6 shows a sectional illustration through a Cartesian guiding device transversely to the conveying direction with the gripping device raised.
Figure 7:
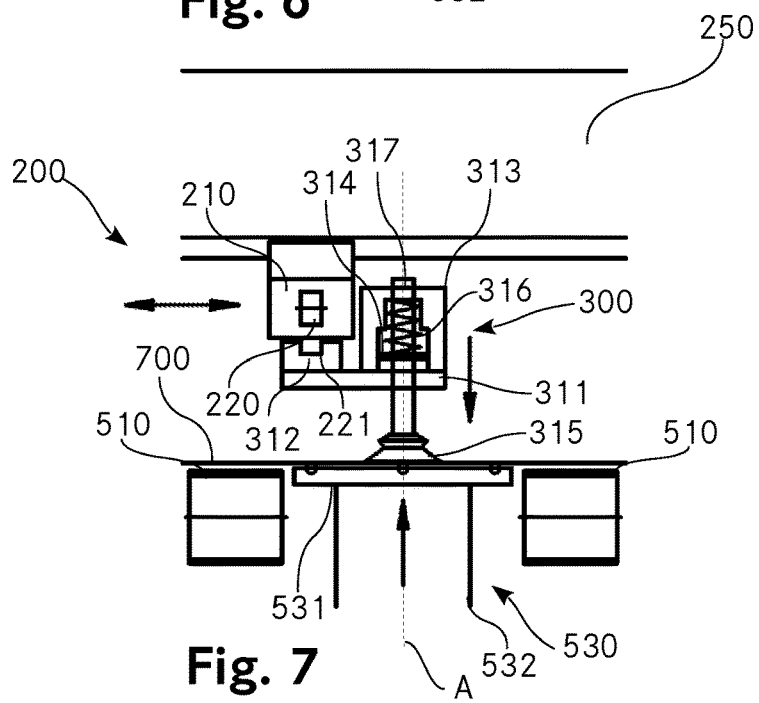
FIG. 7 shows a sectional illustration through a Cartesian guiding device transversely to the conveying direction with the gripping device lowered.

The following FIGS. 5 to 7 show the Cartesian guiding device 200 and in particular the gripping device 300 in detail.

FIG. 5 shows a sectional illustration through a Cartesian guiding device 200 in the conveying direction. The second linear guide 250 can be seen in cross section in this illustration. The first linear guide 210 is held movably thereon via the drive belt 260. The second drive belt 261 is provided for the first linear guide 211 (not visible in this figure). The first linear guide 210 also comprises a drive belt 220 by means of which the gripping device 300 can be moved in the conveying direction.

The gripping device 300 comprises a base plate 311 at one end of which a holder 312 for connecting to the drive belt 220 is fastened. At the other, opposite end of the base plate 311 there is fastened a cylinder 313 in which a piston 314 is mounted in a vertically movable manner. The piston 314 is connected to a piston rod 317 which comprises a sucker 315 at a vertically lower end. Vertically below the piston there is arranged a compression spring 316 which drives the piston 314, and hence also the sucker 315, in the upward direction. In order to lower the sucker, the space in the cylinder 313 vertically above the piston 314 is charged with compressed air. In this way, the piston 314 is moved downward counter to the spring force, whereby the sucker 315 is lowered. In the present FIG. 5, the spring 316 is relaxed substantially (apart from the weight force acting thereon) and the sucker 315 is in the raised state. The sucker 315 is actively actuated with negative pressure (vacuum). The compressed air and vacuum connections, respectively, are not illustrated in the figures, the arrangement thereof being sufficiently clear to a person skilled in the art. The sucker 315 can rotate freely about the vertical axis A, with the result that a workpiece can also be rotated for centering.

FIG. 6 shows a sectional illustration through a Cartesian guiding device 200 transversely to the conveying direction with the gripping device 300 raised. It can clearly be seen in particular on the basis of the first linear guide 210 that the direction of view is now in the conveying direction. Two individual conveyor belt strips 510 can be seen in the region of the conveyor belt 500, wherein the lifting unit 530 is arranged between these two conveyor belt strips 510. The lifting unit 530 comprises a ball plate 531 which can be raised and lowered, respectively, by means of one or more lifting cylinders. The ball plate 531 is connected via supports 532 to a base plate 533 (see FIGS. 2 and 3), which in the present case can be actuated pneumatically. In order to center a workpiece 700 situated in the centering station 100, the gripping device 200, that is to say the sucker 315, is now simultaneously lowered and the workpiece 700 raised by the lifting unit 530 with the ball plates 531 from the conveyor belt strips 510.

FIG. 7 shows a sectional illustration through a Cartesian guiding device 200 transversely to the conveying direction with the gripping device 300 lowered and lifting unit 530 raised. It is now possible in this state for the workpiece 700 to be oriented by means of the Cartesian guiding device 200. For this purpose, all, in the present example the four, gripping devices 300-303 can be moved independently of one another in the plane in order to achieve the desired position of the workpiece 700.

Depending on the configuration, different centerings, where appropriate on a plurality of workpieces, can be performed simultaneously with the centering device 1. For this purpose, the number of linear guides can be varied.

FIGS. 8-12 show schematic illustrations of plan views of Cartesian guiding devices 200 with four gripping devices during the handling of different workpieces 700-706, which by way of example are all rectangular. However, it is clear to a person skilled in the art that any conceivable form of workpieces can be centered with the centering device as long as a surface is present on which a gripping device 300 can grip the workpiece.

Figure 8:
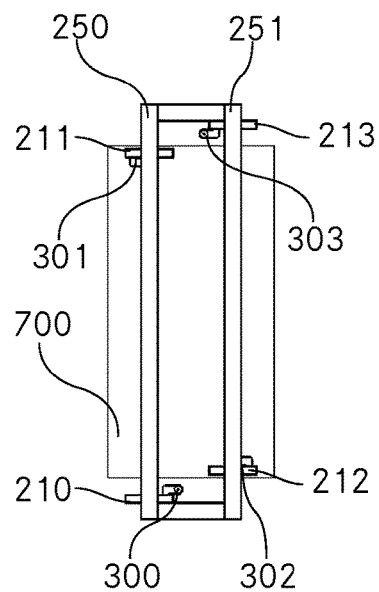
FIGS. 8-12 show schematic illustrations of plan views of Cartesian guiding devices with four gripping devices during the handling of different workpieces.

FIG. 8 shows an arrangement of four gripping devices 300-303, wherein the workpiece 700 is gripped at diagonally opposite ends with only two opposite gripping devices 301 and 302. Here, the workpiece 700 takes up substantially the entire width of the conveyor belt 500 in the present orientation.

Figure 9:
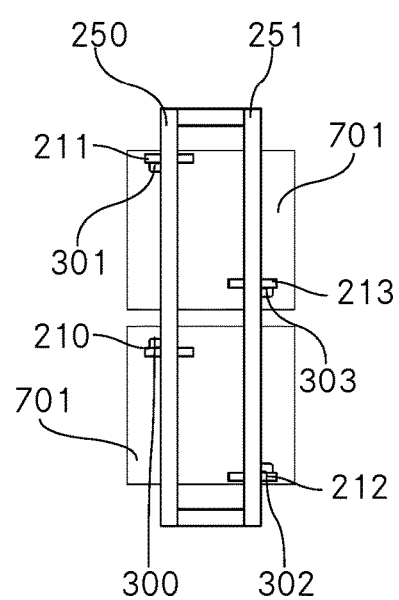

FIG. 9 shows an arrangement according to FIG. 8, wherein in each case a workpiece 701 is gripped at diagonally opposite ends with gripping devices 300, 302 and 301, 303, respectively, situated opposite in pairs. Here, the two workpieces 701 situated next to one another in the transverse direction takes up substantially the entire width of the conveyor belt 500 in the present orientation. It is thus illustrated that even a plurality of workpieces 701 can be centered simultaneously with the centering device 1.

Figure 10:
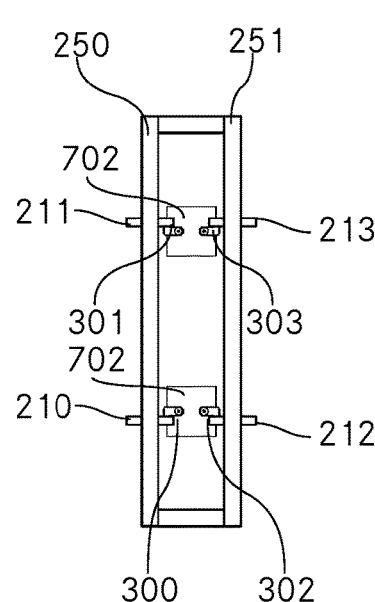

FIG. 10 shows an arrangement according to FIG. 8, wherein in each case a workpiece 702 is gripped oppositely in the center with gripping devices 300, 302 and 301, 303, respectively, situated opposite in pairs. By comparison with the workpieces 701, the workpieces 702 are of small dimensions. It is thus shown that the centering device is substantially independent of the workpiece size.

Figure 11:
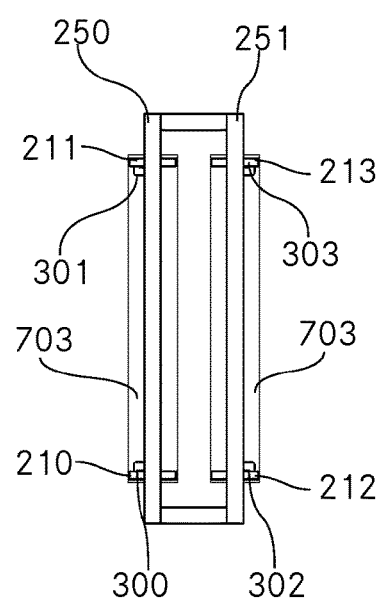

FIG. 11 shows an arrangement according to FIG. 8, wherein in each case a workpiece 703 is gripped by two gripping devices 300, 301 and 302, 303, respectively, arranged next to one another. It is thus shown that a plurality of workpieces 703 arranged behind one another can also be centered simultaneously by the centering device 1.

Figure 12:
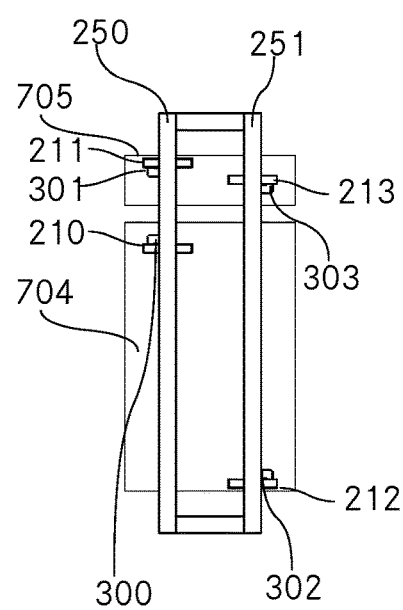

FIG. 12 shows an arrangement according to FIG. 8, wherein in each case a workpiece 704 and 705, respectively, is gripped at diagonally opposite ends with gripping devices 300, 302 and 301, 303, respectively, situated opposite in pairs. Here, the workpieces 704 and 705 have different dimensions transversely to the conveying direction. It is thus illustrated that differently dimensioned workpieces 704, 705 can also be simultaneously centered with the centering device 1.

Figure 13:
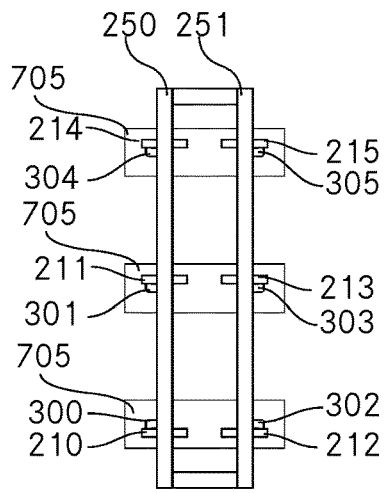
FIG. 13 shows a schematic illustration of a plan view of a Cartesian guiding device with six gripping devices during the handling of three workpieces.

FIG. 13 shows a schematic illustration of a plan view of a Cartesian guiding device 200 with six gripping devices 300-305 during the handling of three identical workpieces 705. In each case a workpiece 705 is gripped at the center at opposite ends with gripping devices 300, 302 and 301, 303 and 304, 305, respectively, situated opposite in pairs. It is thus shown that three workpieces 705 situated next to one another can also be centered simultaneously.

Figure 14:
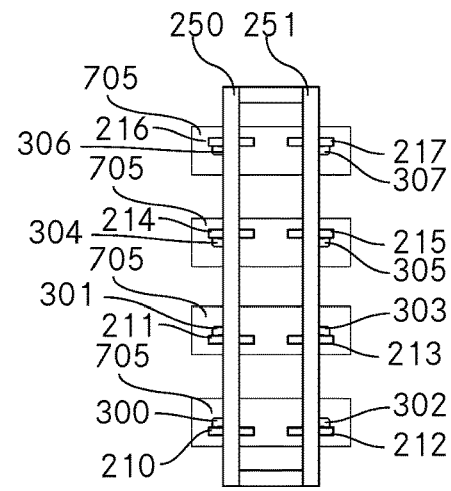
FIGS. 14-16 show schematic illustrations of plan views of Cartesian guiding devices with eight gripping devices during the handling of different workpieces.
Figure 15:
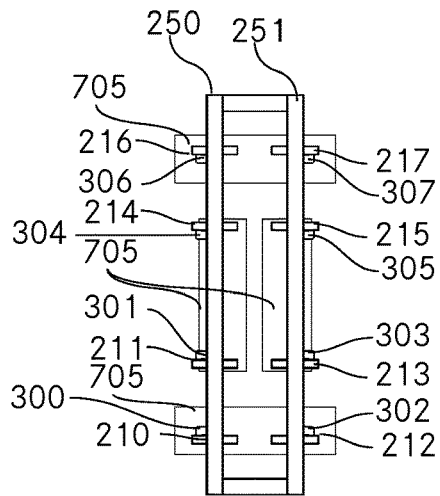
Figure 16:
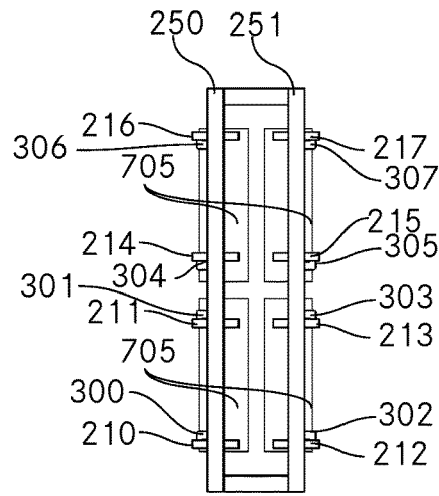

FIGS. 14-16 show schematic illustrations of plan views of Cartesian guiding devices 200 with eight gripping devices 300-307 during the handling of different workpieces. In FIG. 14, workpieces 705 are gripped analogously to FIG. 13, wherein, instead of three of them, now four of them are simultaneously centered. FIG. 15 shows in a substantially analogous manner to FIG. 14 that, of the four workpieces 705 to be centered, all do not necessarily have to have the same orientation. In the present case, two workpieces 705 are oriented with their longitudinal direction transversely to the conveying direction and two in the conveying direction. FIG. 16 likewise shows four workpieces 705 which are now all oriented transversely to the conveying direction.

Figure 17:
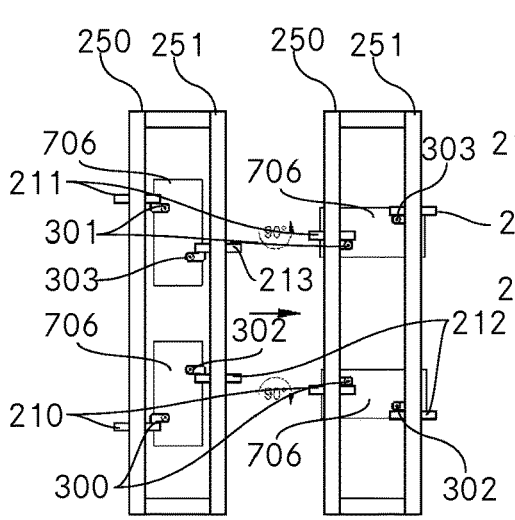
FIG. 17 shows a schematic illustration of a plan view of a Cartesian guiding device with four gripping devices, wherein two workpieces are rotated by an angle of 90°.

FIG. 17 shows a schematic illustration of a plan view of a Cartesian guiding device 200 with four gripping devices 300-303, wherein two workpieces 706 are rotated by an angle of 90°. In the state before centering, the workpieces 706 are each oriented with their longitudinal direction transversely to the conveying direction. The first workpiece 706 is gripped in a diagonally offset manner by the gripping devices 300, 302, and the second workpiece 706 is gripped in a diagonally offset manner by the gripping devices 301, 303. To carry out the rotation, the gripping devices 300, 302 and 301, 303, respectively, are now moved toward one another by means of the first guiding devices 250, 251. At the same time, the gripping devices 300, 302 and 301, 303, respectively, are moved away from one another such that the distance of the gripping devices 300, 302 and 301, 303, respectively, from one another remains constant. If the movement travel of the first linear guides 210-213 is sufficiently large or the workpiece can be gripped with sufficiently small distance between the gripping devices, a rotation about an angle of more than 90° is also possible. If the gripping devices 301 and 303 and 300 and 302, respectively, can cross one another in the conveying direction (the gripping devices would have to be able to be guided with the linear guides for example over a center line transversely to the conveying direction between the second linear guides 250 and 251), a rotation of the workpieces 706 by an angle of more than 180° is possible.

Figure 18:
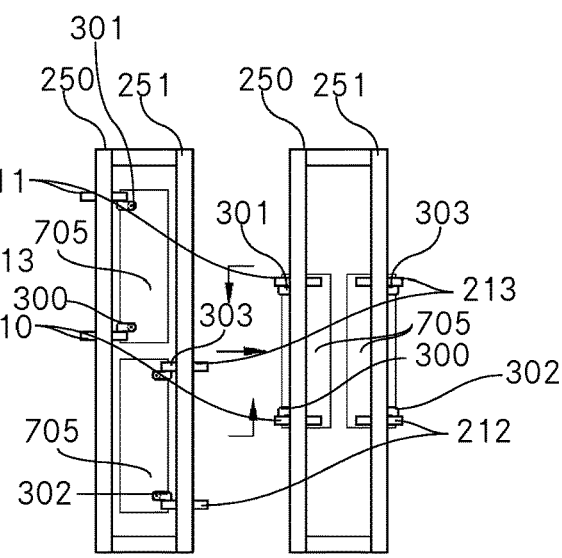
FIG. 18 shows a schematic illustration of a plan view of a Cartesian guiding device with four gripping devices, wherein two workpieces are centered from an arrangement next to one another to an arrangement behind one another.

FIG. 18 shows a schematic illustration of a plan view of a Cartesian guiding device 200 with four gripping devices 300-303, wherein two workpieces 705 are centered from an arrangement next to one another to an arrangement behind one another. In the state before centering, the workpieces 705 are each oriented next to one another with their longitudinal direction transversely to the conveying direction. The first workpiece 705 is gripped by the gripping devices 302, 303 in the region of a front edge in the conveying direction, and the second workpiece 705 is gripped by the gripping devices 300, 301 in the region of a rear edge in the conveying direction. To carry out the movement, the gripping devices 302, 303 are now moved in the conveying direction, and the gripping devices 300, 301 counter to the conveying direction, by means of the first linear guides 212, 213 and 210, 211, respectively. They are then moved toward one another by means of the first guiding devices 250, 251 until they are arranged behind one another with respect to the conveying direction.

It should be noted that, for centering, one or more workpieces can also be gripped multiple times, whereby any desired positioning of a plurality of workpieces among one another is possible.

The conveyor belt 400 does not necessarily have to have conveyor belt strips 410 but can also comprise only a single conveyor belt which has the full transport width. Instead of the conveyor belt 400 there can also be provided another feed conveyor, for example a roller conveyor or the like.

Although, in the present case, the first linear guides 210-217 and the second linear guides 250, 251 are driven by drive belts, they can also comprise other drives, for example a spindle drive, a rack drive or the like. Further variants are known to a person skilled in the art.

The line camera 600 can also be positioned in some other way. Instead of a line camera 600 there can also be provided other detection means in order to determine the position and the orientation before centering.

Whereas exclusively Cartesian guiding devices are shown in the present exemplary embodiments, it is clear to a person skilled in the art that other guiding devices can also be provided. In particular, individual or all Cartesian guiding devices can be replaced in a known manner by robots or the like.

In summary, it should be stated that a centering device is provided according to the invention that, in combination with a simple design, can be used in a particularly variable manner.

The invention claimed is:

1. A centering device for centering flat workpieces comprising a centering station having at least a first and a second gripping device for gripping the workpiece, and conveying device for conveying workpieces in a conveying direction to the centering station, where the first and the second gripping device can each be moved horizontally by a first and a second guiding device, respectively, and wherein the first and the second gripping device can each rotate freely about a different vertical axis when the first and the second gripping device grip a workpiece and are moved horizontally by the first and the second guiding device.

2. The centering device as claimed in claim 1, characterized in that the conveying device comprise at least one conveyor belt.

3. The centering device as claimed in claim 2, characterized in that the conveyor belt comprises a plurality of parallel conveyor belt strips which are spaced apart from one another, wherein a lifting unit having a workpiece support surface is arranged in an interspace between two conveyor belt strips, with the result that, with the workpiece support surface raised, a workpiece can lie exclusively on the workpiece support surface.

4. The centering device as claimed in claim 3, characterized in that the workpiece support surface has a coefficient of friction which is less than a coefficient of friction of a workpiece support surface of the conveyor belt strips.

5. The centering device as claimed in claim 4, characterized in that the surface of the lifting unit comprises a ball plate which is arranged in such a way that, with the lifting unit raised, a workpiece can lie on balls of the ball plate.

6. The centering device as claimed in claim 1, characterized in that the centering station further comprises a third and a fourth gripping device, wherein the third and the fourth gripping device can each rotate freely about a different vertical axis and can each be moved horizontally by means of a third and fourth guiding device, respectively.

7. The centering device as claimed in claim 1, characterized in that one of the guiding devices comprise a first linear guide for moving the corresponding gripping device in the conveying direction and a second linear guide for moving the first linear guide at a right angle to the conveying direction.

8. The centering device as claimed in claim 7, characterized in that the first linear guides of the first and of the second guiding devices are arranged parallel to one another, and the second linear guides of the first and of the second guiding devices are arranged in alignment with one another.

9. The centering device as claimed in claim 7, characterized in that the first linear guide comprises a belt drive for moving the gripping device, and/or the second linear guide comprises a belt drive for moving the first linear guide.

10. The centering device as claimed in claim 7, characterized in that the first and the second gripping device can be lowered and raised.

11. The centering device as claimed in claim 10, characterized in that the first and the second gripping device can be pneumatically raised counter to a restoring force.

12. The centering device as claimed in claim 11, characterized in that the first and second gripping device can be pneumatically raised counter to a spring force.

13. The centering device as claimed in claim 10, characterized in that the first and second gripping device can be lowered and raised relative to the first linear guide.

14. The centering device as claimed in claim 10, characterized in that the first and second gripping device can be pneumatically raised and/or lowered.

15. The centering device as claimed in claim 1, characterized in that the first and the second gripping device comprises a sucker for gripping the workpiece.

16. The centering device as claimed in claim 1, characterized in that it comprises a detection device for detecting a position and an orientation of a conveyed workpiece.

17. The centering device as claimed in claim 16, characterized in that the detection device comprises a line camera which is arranged upstream of the centering station with respect to a conveying direction.

18. The centering device as claimed in claim 17, characterized in that the centering device further comprises a control device which is designed in such a way that the centering station can be controlled on the basis of measurement data of the line camera in such a way that a desired orientation of the workpiece can be achieved.

19. The centering device as claimed in claim 1, characterized in that the flat workpieces are sheet metal blanks to be processed in a press.

20. A method for centering a flat workpiece as claimed in claim 1 comprising the following steps:
    a) determining a current position and an orientation of the workpiece conveyed on the conveying device by means of a detection device;
    b) conveying the workpiece to the centering station;
    c) gripping the workpiece by the first and the second gripping device which can rotate freely about the vertical axes;
    d) orienting the workpiece on the basis of the current position and of a desired position by the first and second guiding devices.

21. A centering device for centering flat workpieces comprising a centering station having at least a first and a second gripping device for gripping the workpiece, and conveying device for conveying workpieces in a conveying direction to the centering station, where the first and the second gripping device can each be moved horizontally by a first and a second guiding device, respectively, and wherein the first and the second gripping device can each rotate freely about an a different vertical axis, wherein the first and second gripping device are each mounted on the first and second guiding device, respectively, so as to be each exclusively freely rotatable, that is exclusively passively rotatable about a different vertical axis.

* * * * *